Figure 1:
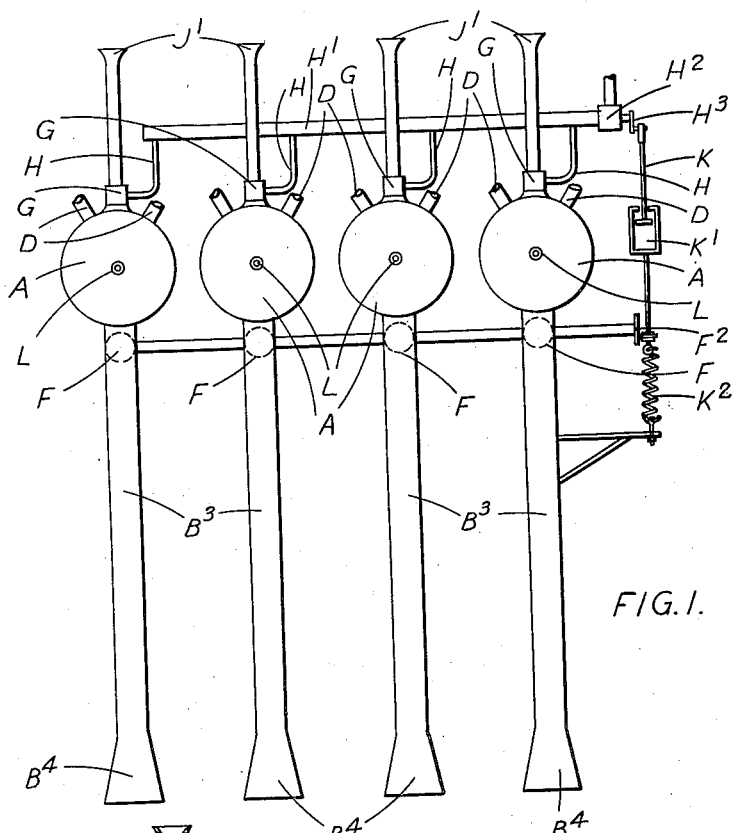

Dec. 1, 1931.  H. R. RICARDO  1,834,473
INTERNAL COMBUSTION ENGINE
Filed Dec. 12, 1928

INVENTOR
Harry R. Ricardo
By Watson, Cort, Morse & Grindle
ATTYS

Patented Dec. 1, 1931

1,834,473

UNITED STATES PATENT OFFICE

HARRY RALPH RICARDO, OF LONDON, ENGLAND

INTERNAL COMBUSTION ENGINE

Application filed December 12, 1928, Serial No. 325,488, and in Great Britain December 19, 1927.

This invention relates to internal combustion engines operating on the four-stroke cycle with spark ignition of the charge, of the kind in which a rich mixture of fuel and air and pure air are respectively admitted to the cylinder or each cylinder through separate ports and has for its object to provide an improved method of and means for operating such engines.

According to the present invention an internal combustion engine of the above type is provided with one or more separate air delivery passages of substantial length through which the air flows to the air inlet ports of each cylinder or to the air inlet ports of two or more cylinders the induction periods of which are such that pulsations will be set up in the air as it flows through the air passage or passages which will increase the pressure at which the air is delivered to the air inlet port or ports during the end portion of the induction period of each cylinder, while the rich mixture of fuel and air is delivered directly into each cylinder through one or more valve-controlled ports serving solely for this purpose, this mixture, which comprises fuel in predetermined and variable charge amounts, being normally too rich to be readily ignited without the supply of additional air.

Preferably a separate unbroken air inlet passage of substantial length is associated with each cylinder through which the air flows freely to the inlet ports of such cylinder only the dimensions and formation of this passage being such that the pulsations set up in the air as it flows therethrough will tend not only to increase the pressure at which the air is supplied to the air inlet ports during the end portion of each induction period but also to increase the depression in the cylinder during the first part of the induction period so as to assist the entry of the rich mixture of fuel and air. In some cases, however, a single long air inlet passage may supply air to the air inlet ports of two or more cylinders and in this case these cylinders should preferably be such that their induction periods do not overlap.

The length and diameter of each air inlet passage will vary according to the piston displacement in each cylinder of the engine to which the invention is applied and also to the speed at which such engine is intended to operate. The length of each air inlet passage, however, should, in order to produce the desired effect be between $$\frac{5.4 \times 10^7}{3n^{1.85}} \text{ feet and } \frac{5.4 \times 10^7}{n^{1.85}} \text{ feet}$$

where $n$ is the speed of the engine in revolutions per minute at which the maximum supercharging effect is desired, while the diameter of the passage should be such that the mean air speed therein during the induction period of the cylinder to which it supplies air will, at an engine speed of $n$ revolutions per minute, be between 80 feet and 180 feet per second.

A separate mixture-forming device is preferably associated with each cylinder whereby the requisite rich mixture is formed for that cylinder only. Means may also be provided for throttling the main air supply flowing to each cylinder through the separate air inlet ports when the quantity of fuel delivered is reduced beyond a predetermined point.

Thus the improved method of supplying the charges of fuel and air to the cylinders of an internal combustion engine of the type referred to comprises supplying each cylinder with fuel from a mixture-forming device, the mixture supplied by which comprises fuel in predetermined and variable charge amounts and is normally too rich to be readily ignited without an additional supply of air, and supplying this additional air to the air inlet ports which serve for this purpose only through one or more long induction passages such that pulsations will be set up in the air as it flows therethrough and these pulsations will tend to assist the inflow of rich mixture by increasing the depression in the cylinder during the first part of the induction period and to increase the pressure at which the air is supplied to the air inlet ports during the end portion of this period.

Figures 2, 3:
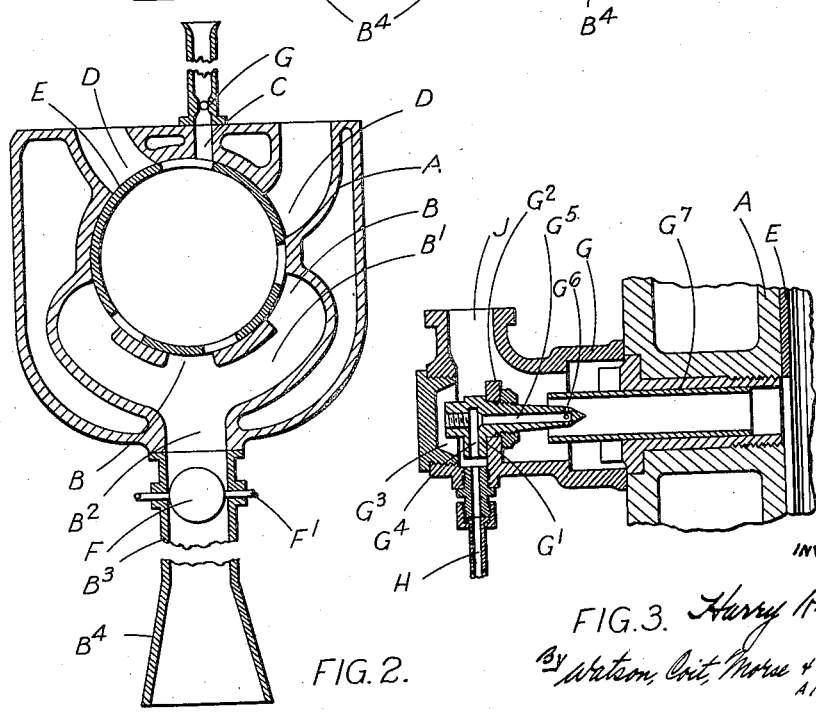

While the present invention is applicable to various engine structures of the general type indicated, it may be employed conveniently in an engine of the sleeve valve type, as for instance one in which there is provided in each cylinder a single sleeve to which is imparted a combined oscillating and reciprocating motion, and one construction of engine of this type having the present invention applied thereto is illustrated somewhat diagrammatically by way of example in the accompanying drawings, in which Figure 1 is a diagrammatic plan of the engine, Figure 2 is a cross-section on an enlarged scale of one of the cylinders of the engine diagrammatically shown in Figure 1, the device for delivering fuel and air mixture to the cylinder being shown diagrammatically, and Figure 3 is a vertical section showing the detailed construction of one form of fuel and air mixture delivering device which may be employed in an engine according to this invention.

In the construction illustrated the engine comprises four cylinders A each provided with three inlet ports B for air, a single inlet port C for a fuel and air mixture and two exhaust ports D, all these ports being controlled by a single sleeve valve E disposed within the cylinder and conveniently having a combined oscillating and reciprocating motion imparted thereto in known manner. Further the inlet ports B are preferably so formed and the sleeve so operated in known manner that the air charge entering the cylinder will tend to rotate about the cylinder axis.

Air is delivered to the three inlet ports B of each cylinder through an air belt $B^1$ from a single air inlet opening $B^2$ communicating with a long air inlet passage $B^3$ of substantially uniform diameter throughout its length except at its outer end where it is flared as shown at $B^4$. A throttle valve F of the butterfly type is disposed in each of the air inlet passages $B^3$, the throttle valves in all the air inlet passages being connected together by a rod $F^1$ so that they can all be simultaneously operated.

Communicating with the fuel and air mixture inlet port C is a fuel and air mixing device G the detail structure of which is shown in Figure 3. This fuel and air mixing device comprises a body part G containing a nozzle member $G^1$ rigidly carried in a bracket $G^2$ within the body. Fuel is delivered by a fuel pipe H to a portion $G^3$ of the casing G constituting a fuel pocket in which fuel can collect during the compression, working and exhaust strokes of the cylinder. The nozzle member $G^1$ is provided with a vertical passage $G^4$ the lower end of which enters the fuel pocket $G^3$, and a horizontal fuel passage $G^5$ terminating in radial outlet orifices $G^6$ through which the fuel passes into a tube $G^7$ mounted within the port C.

The pocket $G^3$ is opened to the atmosphere through a passage J communicating with an air inlet pipe $J^1$ so that on the suction stroke of each cylinder air will not only be drawn directly from the passage J to the tube $G^6$ but will also act to force the fuel out of the pocket $G^3$ through the passages $G^4$ $G^5$ and orifices $G^6$ whereby a rich fuel and air mixture will be delivered to the cylinder through the port C.

The fuel delivery pipes H all communicate with a common passage $H^1$ having a valve $H^2$ therein controlling the quantity of fuel delivered to all the engine cylinders. The valve $H^2$ is connected through a crank $H^3$, a connecting rod K and a lost motion device indicated at $K^1$ to a crank $F^2$ on the rod whereby when the valve $G^2$ has been operated to reduce the quantity of fuel delivered to a predetermined value, further operation of this valve serves not only to reduce the quantity of fuel delivered to each cylinder but also partially to close the throttles and thus reduce the quantity of air drawn in through the passages $B^3$. A spring $K^2$ is provided tending normally to maintain the valves F in their fully opened positions.

The charge in each cylinder is adapted to be ignited by a sparking plug disposed centrally in the cylinder head as indicated at L.

The operation of the engine is as follows.

During the suction stroke the ports B and C are open, air being drawn in through the port B and a rich fuel and air mixture admitted through the port C. During the early portion of the induction stroke the inertia of the air column in each passage $B^3$ causes a depression in the cylinder with which such passage is associated thus tending to increase the flow of rich mixture through the port C. During the later portion of each induction stroke, however, when the piston begins to slow down the momentum which has been imparted to the air in the passage $B^3$ will cause the air to continue to flow into the cylinder and thus to have a supercharging effect. During this period a slight blow back may tend to take place through the port C and the purpose of the pipes $J^1$ is to prevent this blow back causing fuel to be blown out into the atmosphere.

As explained above the air entering through the ports B preferably does so in such a manner as to rotate about the cylinder axis and this rotation will, during the compression stroke tend to cause the fuel particles to accumulate in the centre portion of the charge where the sparking plug is situated. Thus this portion of the charge which is ignited first tends to be richer than the circumferential portion whereby it is possible to employ a relatively weak main mixture strength when not running on full load and yet obtain efficient ignition and combustion.

The fuel is preferably delivered to the pockets G³ through the pipes H by gravity or otherwise a substantially constant pressure the valve H² being in the form of a cock which merely controls the flow of fuel to this pipe.

Each induction passage B³ is formed of such a length and diameter that over a given predetermined speed range of the engine fullest advantages may be obtained from the pulsations of the air column therein. The combined effects of inertia and friction on the air column can be so arranged that the deficiency in charge rate corresponding to the depression caused at the commencement of the induction stroke is more than compensated for by the piling up of pressure in the cylinder at the end of this stroke when the piston is slowing down and the momentum of the air column causes the continued inflow of air into the cylinder. The small quantity of air which enters through the port C acts solely to convey the liquid fuel into the cylinder.

It has been found by experiment that the power output of a particular single sleeve valve engine embodying the present invention can be controlled with completely stable running from 100% load down to 70% load by varying only the quantity of liquid fuel supplied to the nozzle members G¹, the main air supply to each cylinder through the inlet passages B³ being at this time unrestricted. Below 70% load it is necessary to restrict the main air supply in order to give stable running and the lost motion device K¹ is set so as to achieve this end.

As an example of proportions which have been found to operate satisfactorily in practice in a single cylinder sleeve valve engine the following may be cited:—

| | |
|---|---|
| Volume displaced by piston stroke | 538 cubic inches. |
| Engine speed at which maximum weight of charge is obtained | 1,000 revolutions per minute. |
| Internal diameter of the air induction tract | 3¼ inches. |
| Length of the induction tract including the throttle valve casing and air inlet belt | 72 inches. |
| Main air ports open after top dead centre | 15 degrees. |
| Main air ports close after bottom dead centre | 42 degrees. |
| Period during which the main air ports are open | 207 degrees. |
| Mixture port opens after top dead centre | 38 degrees. |
| Mixture port closes after bottom dead centre | 22 degrees. |
| Period during which the fuel mixture admission port is open | 164 degrees. |
| Minimum sectional area of the passage through which the fuel mixture flows to the mixture inlet port | 0.22 square inch. |

With such an engine it has been found that the maximum pressure obtained on the compression stroke is of the order of 22 pounds per square inch higher than the maximum pressure obtainable when a long induction tract is not employed.

It has been found experimentally that such an engine can be run on full air admission without the lengthened induction tract as there is even then sufficient depression within the cylinder to draw the fuel mixture into the cylinder during the induction stroke.

With the lengthened induction tract fitted and running at 1,000 revolutions per minute, the maximum brake mean effective pressure is increased by 18% and the engine will give its maximum brake thermal efficiency over a range of torque lying between 90% and 65%. Over the range from maximum brake mean effective pressure down to 70% of the maximum, the engine will run at 1,000 revolutions per minute with complete stability with full air admission, the power being then controlled on the fuel supply alone. Below 70% torque the running tends to become unstable although the engine will continue to run, but with increasing instability, down to 45% torque. Completely stable running at loads below 70% torque may be obtained, however, by partial closure of the throttle controlling the main air supply.

It has been found that when running in full air admission but with the brake mean effective pressure reduced by limiting the fuel supply as described, the heat losses to the cooling water are appreciably reduced as compared with the heat losses on the same engine when run with an ordinary carburettor supplying a homogeneous charge at the same mean pressure and engine speed. By reason of this feature the improved structure and method of operation is of value when applied to air-cooled engines.

It is to be noted that since the amount of air admitted with the liquid fuel is substantially only sufficient to convey the fuel charges into the cylinder, the fuel mixture passing to the port through which it flows into the cylinder is too rich to be ignited readily, in contra-distinction to the fuel mixture flowing from a carburettor to a normal engine, and further the passages through which the rich mixture enters the cylinder are made of such size that the mixture enters at high velocity. Hence risk of fire due to ignition of this mixture before it enters the engine is minimized or obviated. This is a feature of particular value in the case of engines employed on aircraft.

In the event of there being any tendency for a blow back or outflow of air through the port C when the air pressure within the cylinder is increased towards the end of the induction stroke the loss of fuel which might then result is avoided in the construction illustrated by providing the air inlet pipes J¹. Alternatively the fuel mixture supply device G may be enclosed in a suitable casing. Either arrangement serves to prevent loss of fuel due to a blow back in that if this occurs the fuel carried beyond the mixture-forming device will merely be collected in the pipe J¹ or casing and will drain back into the device or into a suitably arranged sump.

Owing to the wide mixture range at which an engine constructed and operating in accordance with the present invention can run it will be seen that in many cases the mechanism connecting the air throttles F and the liquid fuel control device $H^2$ need be only of such a nature as to give a rough approximation to the correct proportion of fuel and air, the exact mixture strength being finally adjusted by means of the fuel adjustment to suit the settled load conditions, for example, in the case of an engine used for aircraft which during flying conditions is only required to operate over a range of power output or from 100% down to approximately 60%.

The details of construction may be varied in accordance with requirements and the formation of the engine to which the invention is applied, and although particularly applicable to sleeve valve engines the invention may also be employed with engines having other types of valve and means for controlling the several inlet and exhaust ports, with or without means for causing the charge to rotate about each cylinder axis.

What I claim as my invention and desire to secure by Letters Patent is:—

1. An internal combustion engine operating on the four-stroke cycle with spark ignition including in combination a cylinder having at least two inlet ports and one exhaust port therein, valve means for controlling these ports, means for supplying a rich mixture of fuel and air to one of the inlet ports, the mixture normally being too rich to be readily ignited without a supply of additional air, a separate air inlet passage through which such additional air alone can flow freely to the other inlet port, the length of this air inlet passage lying between $$\frac{5.4 \times 10^7}{3n^{1.85}} \text{ feet and } \frac{5.4 \times 10^7}{n^{1.85}} \text{ feet}$$

where $n$ is the speed of rotation of the engine in revolutions per minute at which the maximum supercharging effect is desired, while the diameter of this air inlet passage is such that the mean air speed therein during the induction period at an engine speed of $n$ revolutions per minute lies between 80 feet and 180 feet per second, the inertia of the mixture contained within said mixture supplying means being substantially less than the inertia of the air within the inlet passage.

2. A multi-cylinder internal combustion engine operating on the four-stroke cycle with spark ignition including in combination a plurality of cylinders, at least two inlet ports in each cylinder, means for supplying a rich mixture of fuel and air to one of such ports, the mixture normally being too rich to be readily ignited without a supply of additional air, a separate air inlet passage associated with the other inlet port in each cylinder through which air alone can flow freely, the length of this air inlet passage lying between $$\frac{5.4 \times 10^7}{3n^{1.85}} \text{ feet and } \frac{5.4 \times 10^7}{n^{1.85}} \text{ feet}$$

where $n$ is the speed of rotation of the engine in revolutions per minute at which the maximum supercharging effect is desired while the diameter of each of such air inlet passages is such that the mean air speed during the induction period of a cylinder for an engine speed of $n$ revolutions per minute lies between 80 feet and 180 feet per second, said means being so constructed that the inertia of the mixture contained therein is substantially less than the inertia of the air within the inlet passage, at least one exhaust port in each cylinder and valve means controlling the ports.

3. An internal combustion engine operating on the four-stroke cycle with spark ignition including in combination a cylinder having at least two inlet ports and one exhaust port in its wall, a sleeve valve disposed within the cylinder and controlling these ports, means for imparting to the sleeve valve a combined oscillating and reciprocating motion, means for supplying a rich mixture of fuel and air to one of the inlet ports, the mixture normally being too rich to be readily ignited without a supply of additional air, a separate air inlet passage through which such additional air alone can flow freely to the other inlet port, the length of this air inlet passage lying between $$\frac{5.4 \times 10^7}{3n^{1.85}} \text{ feet and } \frac{5.4 \times 10^7}{n^{1.85}} \text{ feet}$$

where $n$ is the speed of rotation of the engine in revolutions per minute at which the maximum supercharging effect is desired, while the diameter of this air inlet passage is such that the mean air speed therein during the induction period at an engine speed of $n$ revolutions per minute lies between 80 feet and 180 feet per second, the inertia of the mixture contained within said mixture supplying means being substantially less than the inertia of the air within the inlet passage.

4. A multi-cylinder internal combustion engine operating on the four-stroke cycle with spark ignition including in combination a plurality of cylinders, at least two inlet ports and one exhaust port in each cylinder, a sleeve valve disposed within each cylinder and controlling these ports, means for imparting to each sleeve valve a combined oscillating and reciprocating motion, means for supplying a rich mixture of fuel and air to one of such inlet ports in each cylinder, the mixture normally being too rich to be readily ignited without a supply of additional air, a separate air inlet passage associated with the other inlet port in each cylinder through which air alone can flow freely, the length of this air inlet passage lying between $$\frac{5.4 \times 10^7}{3n^{1.85}} \text{ feet and } \frac{5.4 \times 10^7}{n^{1.85}} \text{ feet}$$

where $n$ is the speed of the engine in revolutions per minute at which the maximum supercharging effect is desired, while the diameter of each of such air inlet passages is such that the mean air speed during the induction period of a cylinder at an engine speed of $n$ revolutions per minute lies between 80 feet and 180 feet per second, said means being so constructed that the inertia of the mixture contained therein is substantially less than the inertia of the air within the inlet passage.

5. A multi-cylinder internal combustion engine operating on the four-stroke cycle with spark ignition including in combination a plurality of cylinders, at least two inlet ports and one exhaust port in each cylinder, valve means controlling the ports, a separate mixture-forming device associated with each cylinder whereby a rich mixture of fuel and air is delivered to that cylinder only through one of the inlet ports, the mixture normally being too rich to be readily ignited without a supply of additional air and a separate induction passage associated with the other inlet port in each cylinder through which air alone can flow freely, the length of this air inlet passage lying between $$\frac{5.4 \times 10^7}{3n^{1.85}} \text{ feet and } \frac{5.4 \times 10^7}{n^{1.85}} \text{ feet}$$

where $n$ is the speed of rotation of the engine in revolutions per minute at which the maximum supercharging effect is desired while the diameter of each air inlet passage is such that the mean air speed therein during the induction period of its cylinder is between 80 feet and 180 feet per second, said means being so constructed that the inertia of the mixture contained therein is substantially less than the inertia of the air within the inlet passage.

6. A multi-cylinder internal combustion engine operating on the four-stroke cycle with spark ignition including in combination a plurality of cylinders, at least two inlet ports and one exhaust port in each cylinder, a sleeve valve in each cylinder controlling these ports, means for imparting to each sleeve valve a combined oscillating and reciprocating motion, a separate mixture-forming device associated with each cylinder whereby a rich mixture of fuel and air is delivered to that cylinder only through one of the inlet ports, the mixture normally being too rich to be readily ignited without a supply of additional air, and a separate induction passage associated with the other inlet port in each cylinder through which air alone can flow freely, the length of this air inlet passage lying between $$\frac{5.4 \times 10^7}{3n^{1.85}} \text{ feet and } \frac{5.4 \times 10^7}{n^{1.85}} \text{ feet}$$

where $n$ is the speed of rotation of the engine in revolutions per minute at which the maximum supercharging effect is desired, while the diameter of each air inlet passage is such that the mean air speed therein during the induction period of its associated cylinder for an engine speed of $n$ revolutions per minute is between 80 feet and 180 feet per second, said means being so constructed that the inertia of the mixture contained therein is substantially less than the inertia of the air within the inlet passage.

7. An internal combustion engine operating on the four-stroke cycle with spark ignition including in combination a cylinder having at least two inlet ports and one exhaust port therein, valve means for controlling these ports, means for supplying a rich mixture of fuel and air to one of the inlet ports the mixture normally being too rich to be readily ignited without a supply of additional air, a separate air inlet passage through which such additional air alone can flow freely to the other inlet port, the length of this air inlet passage lying between $$\frac{5.4 \times 10^7}{3n^{1.85}} \text{ feet and } \frac{5.4 \times 10^7}{n^{1.85}} \text{ feet}$$

where $n$ is the speed of rotation of the engine in revolutions per minute at which the maximum supercharging effect is desired, while the diameter of this air inlet passage is such that the mean air speed therein during the induction period for an engine speed of $n$ revolutions per minute lies between 80 feet and 180 feet per second, the inertia of the mixture contained within said mixture supplying means being substantially less than the inertia of the air within the inlet passage, and means for controlling the power output of the engine by varying the quantity of fuel in the rich mixture.

8. A multi-cylinder internal combustion engine operating on the four-stroke cycle with spark ignition including in combination a plurality of cylinders, at least two inlet ports in each cylinder, means for supplying a rich mixture of fuel and air to one of such ports, the mixture normally being too rich to be readily ignited without a supply of additional air, a separate air inlet passage associated with the other inlet port in each cylinder through which air alone can flow freely, the length of this air inlet passage lying between $$\frac{5.4 \times 10^7}{3n^{1.85}} \text{ feet and } \frac{5.4 \times 10^7}{n^{1.85}} \text{ feet}$$

where $n$ is the speed of the engine in revolutions per minute at which the maximum supercharging effect is desired, while the diameter of each of such air inlet passages is such that the mean air speed during the induction period of a cylinder at an engine speed of $n$ revolutions per minute lies between 80 feet and 180 feet per second, said means being so constructed that the inertia of the mixture contained therein is substantially less than the inertia of the air within the inlet passage, at least one exhaust port in each cylinder, valve means controlling the ports and means for controlling the power output of the engine by varying the quantity of fuel in the rich mixture.

9. An internal combustion engine operating on the four-stroke cycle with spark ignition including in combination a cylinder having at least two inlet ports and one exhaust port in its wall, a sleeve valve disposed within the cylinder and controlling these ports, means for imparting to the sleeve valve a combined oscillating and reciprocating motion, means for supplying a rich mixture of fuel and air to one of the inlet ports, the mixture normally being too rich to be readily ignited without a supply of additional air, a separate air inlet passage through which such additional air alone can flow freely to the other inlet port, the length of this air inlet passage lying between $$\frac{5.4 \times 10^7}{3n^{1.85}} \text{ feet and } \frac{5.4 \times 10^7}{n^{1.85}} \text{ feet}$$

where $n$ is the speed of rotation of the engine in revolutions per minute at which the maximum supercharging effect is desired, while the diameter of this air inlet passage is such that the mean air speed therein during the induction period at an engine speed of $n$ revolutions per minute lies between 80 feet and 180 feet per second, said means being so constructed that the inertia of the mixture contained therein is substantially less than the inertia of the air within the inlet passage, and means for controlling the power output of the engine by varying the quantity of fuel in the rich mixture.

10. A multi-cylinder internal combustion engine operating on the four-stroke cycle with spark ignition including in combination a plurality of cylinders, at least two inlet ports and one exhaust port in the wall of each cylinder, a sleeve valve disposed within each cylinder and controlling the ports therein, means for imparting to each sleeve valve a combined oscillating and reciprocating motion, means for supplying a rich mixture of fuel and air to one of such inlet ports in each cylinder, the mixture normally being too rich to be readily ignited without a supply of additional air, a separate air inlet passage associated with the other inlet port in each cylinder through which air alone can flow freely, the length of this air inlet passage lying between $$\frac{5.4 \times 10^7}{3n^{1.85}} \text{ feet and } \frac{5.4 \times 10^7}{n^{1.85}} \text{ feet},$$

where $n$ is the speed of rotation in revolutions per minute at which the maximum supercharging effect is desired, while the diameter of each of such air inlet passages is such that the mean air speed during the induction period of a cylinder for an engine speed of $n$ revolutions per minute lies between 80 feet and 180 feet per second, said means being so constructed that the inertia of the mixture contained therein is substantially less than the inertia of the air within the inlet passage, and means for controlling the power output of the engine by varying the quantity of fuel in the rich mixture.

11. A multi-cylinder internal combustion engine operating on the four-stroke cycle with spark ignition including in combination a plurality of cylinders, at least two inlet ports and one exhaust port in each cylinder, valve means controlling the ports, a separate mixture-forming device associated with each cylinder whereby a rich mixture of fuel and air is delivered to that cylinder only through one of the inlet ports, the mixture normally being too rich to be readily ignited without a supply of additional air, a separate induction passage associated with the other inlet port in each cylinder through which air alone can flow freely, the length of this air inlet passage lying between $$\frac{5.4 \times 10^7}{3n^{1.85}} \text{ feet and } \frac{5.4 \times 10^7}{n^{1.85}} \text{ feet}$$

where $n$ is the speed of rotation of the engine in revolutions per minute at which the maximum supercharging effect is desired, while the diameter of each air inlet passage is such that the mean air speed therein during the induction period of the cylinder associated therewith and for an engine speed of $n$ revolutions per minute lies between 80 feet and 180 feet per second, said mixture forming device being so constructed that the mixture contained therein has substantially less inertia than the air in the inlet passage, means for varying the quantity of fuel delivered by each of the mixture-forming devices and an interconnection between such means whereby the quantity of fuel delivered to all the cylinders can be controlled simultaneously.

12. An internal combustion engine operating on the four-stroke cycle with spark ignition including in combination a cylinder having at least two inlet ports and one exhaust port therein, valve means for controlling these ports, means for supplying a rich mixture of fuel and air to one of the inlet ports, the mixture normally being too rich to be readily ignited without a supply of additional air, a separate air inlet passage associated with the other inlet port through which air alone can flow freely, the length of this air inlet passage lying between $$\frac{5.4 \times 10^7}{3n^{1.85}} \text{ feet and } \frac{5.4 \times 10^7}{n^{1.85}} \text{ feet}$$

in which $n$ is the speed in revolutions per minute of the engine at which the maximum supercharging effect is desired, while the diameter of the air inlet passage is such that the mean air speed during the induction period for an engine speed of $n$ revolutions per minute lies between 80 feet and 180 feet per second, said means being so constructed that the inertia of the mixture contained therein is substantially less than the inertia of the air within the inlet passage, a valve in the air inlet passage, means for controlling the power output of the engine by varying the quantity of fuel in the rich mixture, and an interlock between such fuel control means and the valve in the air passage such that the air passage will only be appreciably throttled after the quantity of fuel in the rich mixture has been substantially reduced.

13. A multi-cylinder internal combustion engine operating on the four-stroke cycle with spark ignition including in combination a plurality of cylinders, at least two inlet ports and one exhaust port in each cylinder, means for supplying a rich mixture of fuel and air to one of the inlet ports in each cylinder, the mixture normally being too rich to be readily ignited without a supply of additional air, a separate air inlet passage associated with the other inlet port in each cylinder through which air alone can flow freely, the length of each air inlet passage lying between $$\frac{5.4 \times 10^7}{3n^{1.85}} \text{ feet and } \frac{5.4 \times 10^7}{n^{1.85}} \text{ feet}$$

where $n$ is the speed of rotation of the engine in revolutions per minute at which the maximum supercharging effect is desired, while the diameter of the air inlet passage is such that the mean air speed during the induction period for an engine speed of $n$ revolutions per minute lies between 80 feet and 180 feet per second, said means being so constructed that the inertia of the mixture contained therein is substantially less than the inertia of the air within the inlet passage, a valve in each air inlet passage, means for controlling the power output of the engine by varying the quantity of fuel in the rich mixture supplied to each cylinder and an interlock between such fuel control means and the valves in the air passages such that the air passages will only be appreciably throttled after the quantity of fuel in the rich mixture has been substantially reduced.

14. A multi-cylinder internal combustion engine operating on the four-stroke cycle with spark ignition including in combination a plurality of cylinders at least two inlet ports and one exhaust port in the wall of each cylinder, a sleeve valve in each cylinder controlling such ports, means for imparting to each sleeve valve a combined oscillating and reciprocating motion, means for supplying a rich mixture of fuel and air to one of the inlet ports in each cylinder, the mixture normally being too rich to be readily ignited without a supply of additional air, a separate air inlet passage associated with the other inlet port in each cylinder through which air alone can flow freely the length of each air inlet passage lying between $$\frac{5.4 \times 10^7}{3n^{1.85}} \text{ feet and } \frac{5.4 \times 10^7}{n^{1.85}} \text{ feet}$$

where $n$ is the speed of the engine in revolutions per minute at which the maximum supercharging effect is desired, while the diameter of the air inlet passage is such that the mean air speed during the induction period for an engine speed of $n$ revolutions per minute lies between 80 feet and 180 feet per second, said means being so constructed that the inertia of the mixture contained therein is substantially less than the inertia of the air within the inlet passage, a valve in the air inlet passage, means for controlling the power output of the engine by varying the quantity of fuel in the rich mixture, and an interlock between such fuel control means and the valve in the air passage such that the air passage will only be appreciably throttled after the quantity of fuel in the rich mixture has been substantially reduced.

15. In an internal combustion engine operating on the four stroke cycle with spark ignition, the combination with a cylinder having at least two inlet ports and one exhaust port therein, of valve means for controlling these ports, means for supplying a rich mixture of fuel and air to one of the inlet ports, and a separate air inlet passage for conducting additional air to the other inlet port, the relative dimensions of the mixture supplying means and the air inlet passage being such that the inertia of the air in the passage is substantially greater than the inertia of the mixture in said supplying means.

In testimony whereof I have signed my name to this specification.

HARRY RALPH RICARDO.